US009262279B2

(12) United States Patent
Jin et al.

(10) Patent No.: US 9,262,279 B2
(45) Date of Patent: Feb. 16, 2016

(54) CLASSIFYING AND MONITORING DATABASE OPERATIONS BASED ON A COST OF RECOVERY

(71) Applicant: International Business Machines Corporation, Armonk, NY (US)

(72) Inventors: Gary N. Jin, Portland, OR (US); Steven R. Pearson, Portland, OR (US); Prasadarao Akulavenkatavara, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 14/312,736

(22) Filed: Jun. 24, 2014

(65) Prior Publication Data

US 2015/0081643 A1     Mar. 19, 2015

Related U.S. Application Data

(63) Continuation of application No. 14/030,164, filed on Sep. 18, 2013.

(51) Int. Cl.
G06F 7/00        (2006.01)
G06F 17/30       (2006.01)
G06F 11/14       (2006.01)
G06F 11/30       (2006.01)

(52) U.S. Cl.
CPC ........ *G06F 11/1458* (2013.01); *G06F 11/1469* (2013.01); *G06F 11/3003* (2013.01); *G06F 17/30289* (2013.01); *G06F 11/1471* (2013.01); *G06F 11/3082* (2013.01); *G06F 2201/80* (2013.01); *G06F 2201/865* (2013.01); *G06F 2201/88* (2013.01)

(58) Field of Classification Search
None
See application file for complete search history.

(56) References Cited

U.S. PATENT DOCUMENTS

| 7,246,254 | B2 | 7/2007 | Alur et al. |
| 7,457,830 | B1* | 11/2008 | Coulter ............... G06F 11/1471 |
| 8,260,750 | B1 | 9/2012 | Gugick et al. |
| 2006/0255940 | A1 | 11/2006 | White et al. |
| 2008/0154979 | A1 | 6/2008 | Saitoh et al. |
| 2012/0089572 | A1* | 4/2012 | Raichstein .......... G06F 11/1461 707/645 |
| 2012/0137282 | A1 | 5/2012 | Illowsky et al. |
| 2012/0303998 | A1 | 11/2012 | Sun |

OTHER PUBLICATIONS

Roselinda R. Schulman, "Disaster Recovery Issues and Solutions" Hitachi data systems, white paper, Sep. 2004, 23 pages.*
Jin et al, "U.S. Appl. No. 14/030,164,"filed Sep. 18, 2013, p. 1-28.
Jin et al, "U.S. Appl. No. 14/030,168," filed Sep. 18, 2013, p. 1-41.
Nakamura, et al., "A Flexible Replication Mechanism with Extended Database Connection Layers," Fifth IEEE International Symposium on Network Computing and Applications, 2006, NCA'06, IEEE Computer Society.
Nakamura, et al., "Optimal backup interval of database by incremental backup method," Proceedings of the 2009 IEEE IEEM, 2009, p. 218-222.

(Continued)

*Primary Examiner* — Uyen Le
(74) *Attorney, Agent, or Firm* — Teddi Maranzano; Mohammed Kashef

(57) ABSTRACT

A method of classifying and monitoring database operations based on a recovery cost may include receiving an indication of a recoverable operation. A count in a persistent storage, such as a catalog, corresponding to an occurrence of the recoverable operation is incremented.

7 Claims, 3 Drawing Sheets

(56) References Cited

OTHER PUBLICATIONS

Qian et al., "Optimal Backup Policies for a Database System with Incremental Backup," Electronics and Communications in Japan, 2002, p. 1-9, vol. 85, No. 4, Scripta Technica.

Ruiz et al., "New Models for the Clustering of Large Databases through a Hierarchical Paradigm," Proceedings of the 5th International Conference on Intelligent Systems Design and Applications, 2005, IEEE Computer Society.

* cited by examiner

CLASSIFYING AND MONITORING DATABASE OPERATIONS BASED ON A COST OF RECOVERY

CROSS REFERENCE

The present application is a continuation of and claims priority under 35 U.S.C. §120 of U.S. patent application Ser. No. 14/030,164, filed on Sep. 18, 2013, which is incorporated by reference in its entirety.

FIELD

The present disclosure relates generally to the field of database management systems, and more particularly, to planning database backup and recovery operations.

BACKGROUND

A Database Management System (DBMS) stores large volumes of data to support diverse workloads and heterogeneous applications. The DBMS is critical to business transaction processing and decision making, and may incorporate strategies that promote keeping the data highly available. However, a DBMS may unexpectedly fail for various reasons, including defects in a hardware or software component within a computer system.

A DBMS may perform many complex operations, consisting of multiple steps, such as for example, creating a new table. The amount of work required to complete an operation varies, and may depend upon such factors as the algorithms and architecture chosen by the DBMS vendor to implement product features. Similarly, the time required to recover an operation (i.e., replay from the log) varies by the type of operation. For example, a table reorganization operation is much more complex, i.e., takes more steps to complete, than an operation to insert a row of data in a table, and consequently will take much longer to recover. A recovery cost is not a simple linear function that is based solely on the amount of data and a number of operations, but is also dependent on the type of workloads and the complexity of the operations that are executed. The nonlinear nature of database operations makes it challenging for a Database Administrator (DBA) to predict the time it will take to perform a future recovery operation. Consequently, the DBA may often rely on a combination of intuition, trial and error, and experience when designing a recovery plan to meet the business enterprise's Recovery Time Objective (RTO), which may be referred to as a maximum length of time that a DBMS may remain unavailable following a service disruption.

One solution that the DBA may often choose is to back up a database more frequently than required, rather than risk a situation where the business may miss the RTO goal or be unable to meet a Service Level Agreement with an end user community. This problem becomes more pronounced in a cloud environment where the volume of data tends to be high, the types of workloads accessing the data tend to be much more diverse, and there tends to be fewer DBAs available to manage the installation. It may also be advantageous, when planning for or monitoring recovery operations, for a DBA or an administrative tool to be able to predict with reasonable accuracy how long a particular recovery will take.

It may therefore be desirable, among other things, to provide a method and system of classifying database operations by their estimated recovery cost, and tracking the number of each kind of operation that has been performed on a database such that the amount of time necessary to complete a recovery operation for the database can be approximated with reasonable accuracy.

BRIEF SUMMARY

Among other things, a method and system of classifying and monitoring database operations based on a recovery cost according to one or more embodiments of the present invention is provided.

According to an aspect of the invention, a method of classifying and monitoring database operations based on a recovery cost may include receiving an indication of a recoverable operation using a program, the program being executable by a processor of a computer; and incrementing a count in a persistent storage corresponding to an occurrence of the recoverable operation.

BRIEF DESCRIPTION OF THE SEVERAL VIEWS OF THE DRAWING

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

As used herein, "Recovery Time Objective" (RTO) may represent a result of a business impact analysis, wherein a business enterprise determines the maximum length of time that a critical business service, such as a Database Management System (DBMS) and the applications that rely upon it, may be unavailable.

A "Recovery Point Objective" (RPO) may refer to a measurement of acceptable data loss over a period of time, such as during a service disruption. For example, where a business rule specifies that no more than ten minutes of transactional data may be lost, then the appropriate actions, such as committing transactions at the application level, or backing up the transaction log at the DBMS level, should occur no less frequently than the RPO of ten minutes.

A backup of all the data and database objects within a database may be referred to as a "full backup." In case of a service disruption requiring a complete recovery (i.e., restoration) of the database, the full backup is needed.

An "incremental backup" may be considered a type of partial backup because it contains only the changes to the database since the last full or partial backup. The recovery of the database may be made to a point in time by restoring a full backup and one or more partial, i.e., incremental, backups.

As used herein, the term "backup" may refer to either a full backup or an incremental backup unless a distinction is made.

Figure 1:
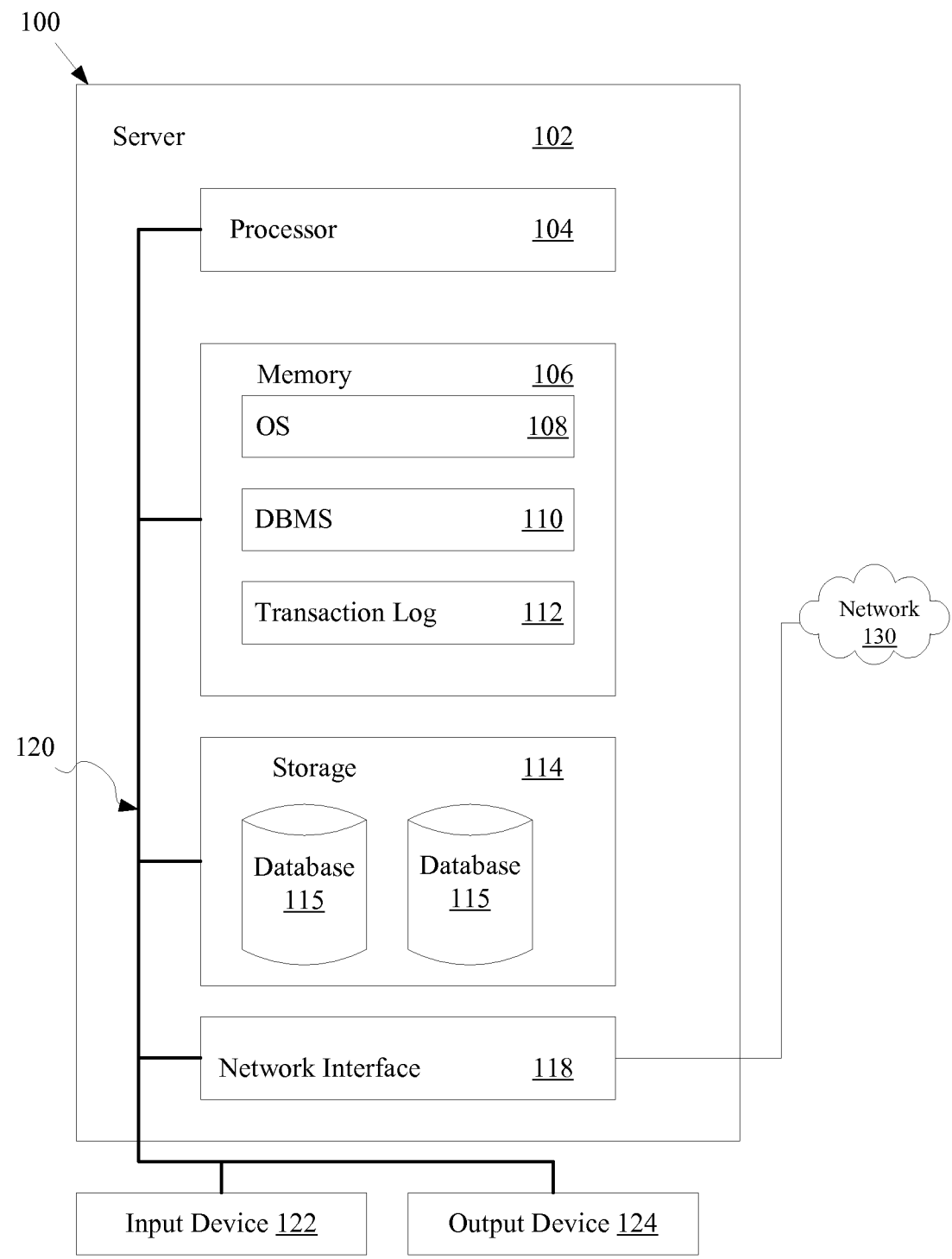
FIG. 1 is a block diagram illustrating an exemplary embodiment of a system for classifying and monitoring database operations based on a recovery cost.
Figure 2:
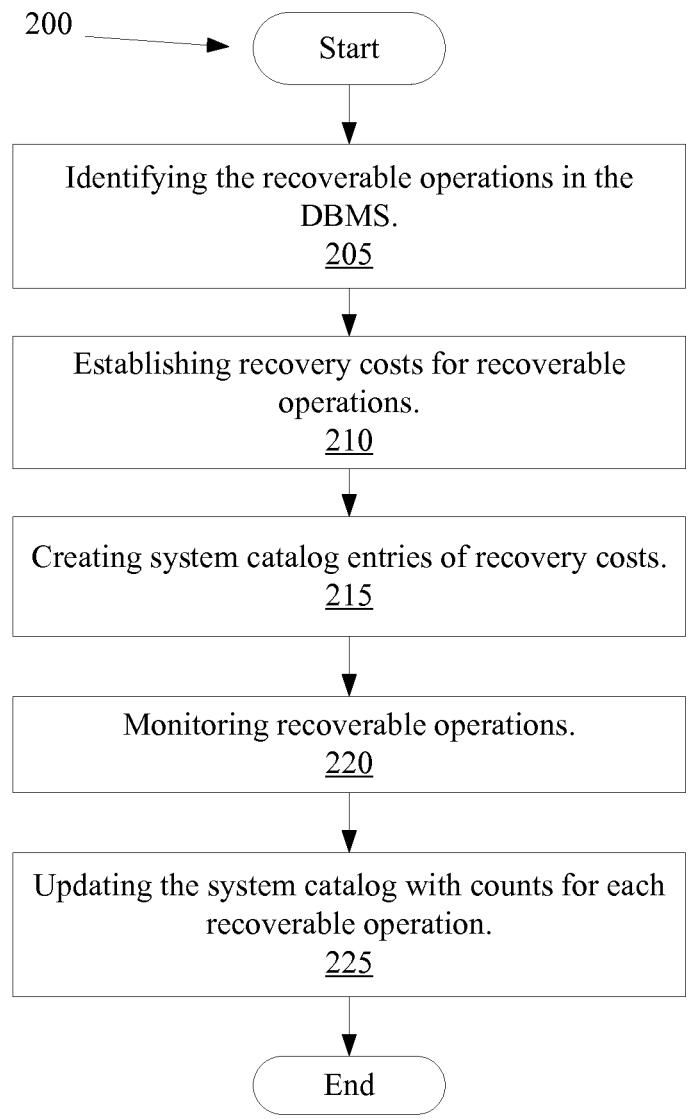
FIG. 2 is a flow diagram illustrating an overview of an exemplary embodiment of a method of classifying and monitoring database operations based on a recovery cost.

Embodiments of the present invention will now be described with reference to the figures. Referring to FIGS. 1 and 2, according to an embodiment of the disclosure, a system 100 and method 200 provide an implementation for classifying and monitoring database operations based on a recovery cost.

FIG. 1 is a block diagram illustrating an exemplary embodiment of a system 100 for classifying and monitoring database operations based on a recovery cost. The networked system 100 includes a server 102. The server 102 may also be connected to other computers and servers via a network 130. In general, the network 130 may be a telecommunications network and/or a wide area network (WAN). In a particular embodiment, the network 130 is the Internet.

The server 102 generally includes a processor 104 connected via a bus 120 to a memory 106, a network interface device 118, a storage 114, an input device 122, and an output device 124. The server 102 is generally under the control of an operating system 108, such as for example Linux. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 118 may be any type of network communications device allowing the server 102 to communicate with other computers via the network 130.

The storage 114 may be a persistent storage device. Although the storage 114 is shown as a single unit, the storage 114 may be a combination of fixed and/or removable storage devices, such as fixed disc drives, solid state drives, floppy disc drives, tape drives, removable memory cards or optical storage. The memory 106 and the storage 114 may be part of one virtual address space spanning multiple primary and secondary storage devices.

The input device 122 may be any device for providing input to the server 102. For example, a keyboard and/or a mouse may be used. The output device 124 may be any device for providing output to a user of the server 102. For example, the output device 116 may be any conventional display screen or set of speakers. Although shown separately from the input device 122, the output device 124 and input device 122 may be combined. For example, a display screen with an integrated touch-screen may be used.

As shown, the memory 106 of the server 102 includes a DBMS 110 configured to manage one or more databases 115, contained in the storage 114 of the server 102. Each database 115 may store data used by one application, or alternatively, several applications may share one or more databases. As shown, the memory 106 of server 102 also contains a transaction log 112, which records sufficient information (i.e., transaction log records) for the DBMS to restore the database to a consistent state in case of a service disruption. In an exemplary embodiment, the transaction log records may contain a timestamp, a transaction id, a database page identifier, a checksum value, a value identifying an operation type, pointers to other related log records, and may further contain an image of the data both before and after the modification. Embodiments of the invention may include any mechanism for maintaining timing and sequencing in place of a timestamp.

The particular description in FIG. 1 is for illustrative purposes only; it should be understood that the invention is not limited to specific described embodiments, and any combination is contemplated to implement and practice the invention.

Referring now to FIG. 2, a flow diagram 200 illustrating the operation of a method of classifying and monitoring database operations based on a recovery cost according to one embodiment is depicted. The process of flow diagram 200 may be implemented as executable instructions such as one or more computer programs stored within memory 106 (FIG. 1) and capable of running on processor 104 (FIG. 1). Alternatively, the process of flow diagram 200 may be implemented as executable instructions such as one or more computer programs stored within tangible storage devices 830 (FIG. 3) and capable of running on processor(s) 820 (FIG. 3) upon being accessed via external components 900.

At 205, the DBMS vendor identifies the recoverable operations that the DBMS may perform, such as an insertion of a row of data or a creation of a table. A recoverable operation may be defined as an operation that changes the state of database objects such as user data, or an operation that changes the state of database control structures such as the DBMS system catalog tables. A recoverable operation may further include one that the DBMS tracks using a plurality of transaction log records so that the operation may be recovered. As a result, in the event of a DBMS service disruption, the DBMS may use the transaction log records in combination with existing full and incremental backups, as needed, to restore the database to a state prior to the failure.

At 210, having defined the recoverable operations in the DBMS, the DBMS vendor may now associate each recoverable operation with a value representing a recovery cost. A recovery cost value refers to an abstract unit that represents the cost to recover a given recoverable operation in the DBMS. A recovery cost of a given operation may be expressed in units relative to a base unit. Although it may be related to an amount of time it takes to perform recovery for the recoverable operation, a recovery cost value is expressed in units that are some multiple of a base operation, as defined by the DBMS vendor. A base operation may be a recoverable operation that requires the least amount of time to recover. For example, during benchmark testing, a DBMS vendor may establish that recovering an insert of a row of data is the least resource-intensive operation, and thus it is defined as the base operation and is assigned a recovery cost of "1" unit. If, for example, further benchmark testing establishes that recovering creation of a new table takes "6" microseconds (µs), where the base operation takes "2" µs, then recovering the creation of the new table may be recognized as taking three times longer to complete, and thus be assigned a relative recovery cost of "3" units. In this example, recovering the creation of a new table may include inserting new entries in several system catalog tables, creating an index for the new table, and inserting the new rows of data, whereas, in contrast, recovery of inserting a row of data may only consist of the one operation. Assigning the table creation operation a higher recovery cost relative to the base operation recognizes the higher number of complex operations required to complete the table creation.

At 215, the DBMS vendor may provide the recovery cost values for recoverable operations in a persistent store, such as one or more tables within the system catalog of the DBMS, for example:

```
SystemCatalog.RecoveryCostOfOperations
{
    OperationName    // Type of operation, such as insert or delete row
    RecoveryCost     // Number of recovery cost units to recover this
                     operation
    OperationCount   // Accumulated count of this operation
}
```

A default cost of each recoverable operation is determined by the DBMS vendor, and is based on the DBMS vendor's knowledge of the internal algorithms and measurements used to implement the recoverable operations.

In another exemplary embodiment, the DBMS vendor may group operations of similar recovery cost values into classes for ease of management. For example:

```
SystemCatalog.RecoveryClasses
{
    ID              // Class identifier
    ClassName       // E.g., low, medium, high
    CostRange       // E.g., microsecond low to microsecond high values
    OperationCount  // Accumulated count of operations in this class
}
```

As an example, a DBMS may group the recoverable operations into classes, such as "low", "medium", and "high" according to the recovery cost. In operation, recovery objectives such as RTO and RPO may frequently be expressed in terms of a scale magnitude, for example, seconds, vs. minutes vs. hours. Therefore, the classes may be based on a scale of magnitude of recovery cost. For example, recoverable operations classified as "high" may be on an order of ten times more costly to recover than those classified as "medium." Similarly, "medium" class recoverable operations may be on an order of ten times more costly to recover than those recoverable operations classified as "low" cost. Using a Structured Query Language (SQL) based interface, an end-user having sufficient authority to perform functions on the system catalogs, for example a DBA, may define, alter, or delete the recovery classes as desired to architect a recovery plan that more closely reflects a particular DBMS environment and business enterprise RTO/RPO goal. Additionally, during a subsequent product upgrade, the DBMS vendor may supply updated recovery cost values to the persistent store that may reflect performance enhancements or other additional features in the DBMS.

At 220, the DBMS may allocate specialized processes (e.g., threads) to share and parallelize work, such as virtual memory management, data Input/Output, query processing, and monitoring recoverable operations as they occur. Thus the DBMS is implicitly aware of the types of recoverable operations, such as for example an insert of a row of data, that are taking place. The DBMS may include different code paths to execute and manage each of the various recoverable operations. When a particular recoverable operation, for example an insert of a row of data, is executed, then that specific logic, or code path, is invoked. As part of that logic, at 225 the DBMS may also update the persistent storage to increment the count corresponding to the recoverable operation type. In another exemplary embodiment, at 220 the DBMS threads may synchronously parse the transaction log records as they are created. Or, alternatively, the DBMS threads may asynchronously act as background processes to periodically scan the transaction log after the transaction log records are written. The recoverable operations may be tracked for all databases in the DBMS, or alternatively, by some other unit of recovery, such as an application, a DBMS object, or individual table spaces.

At 225, having encountered and identified a recoverable operation at 220, the DBMS may then update the persistent store to increment the count corresponding to the recoverable operation encountered. For example, the recoverable operation of inserting a row of data may occur ten (10) times over a period of time. Thus, the count value for this operation is ten (10). In one exemplary embodiment, the counts may be accumulated and updated either by class, or by individual recoverable operation, depending upon the level of granularity desired and the implementation chosen by the business enterprise. The persistent store may be updated immediately upon accumulating the counts of recoverable operations for a transaction. However, to reduce contention for access to DBMS system resources, alternatively the counts may be accumulated to a temporary storage area and periodically updated to the persistent store. An authorized end-user, such as the DBA, may periodically review the counts of recoverable operations through the SQL interface to the DBMS.

In operation, the count values along with the recovery cost may be utilized by, for example, the DBA to determine recovery times for different recoverable operations within the log. For example, one operation may have a predetermined recovery cost of "1" unit, whereby each unit corresponds to a process time of "2" μs. Also, this operation may have a count value of ten (10). Accordingly, the recovery time for operations of this type may be 20 μs (i.e., recovery cost×unit process time×count value=1×2 μs×10=20 μs).

Figure 3:
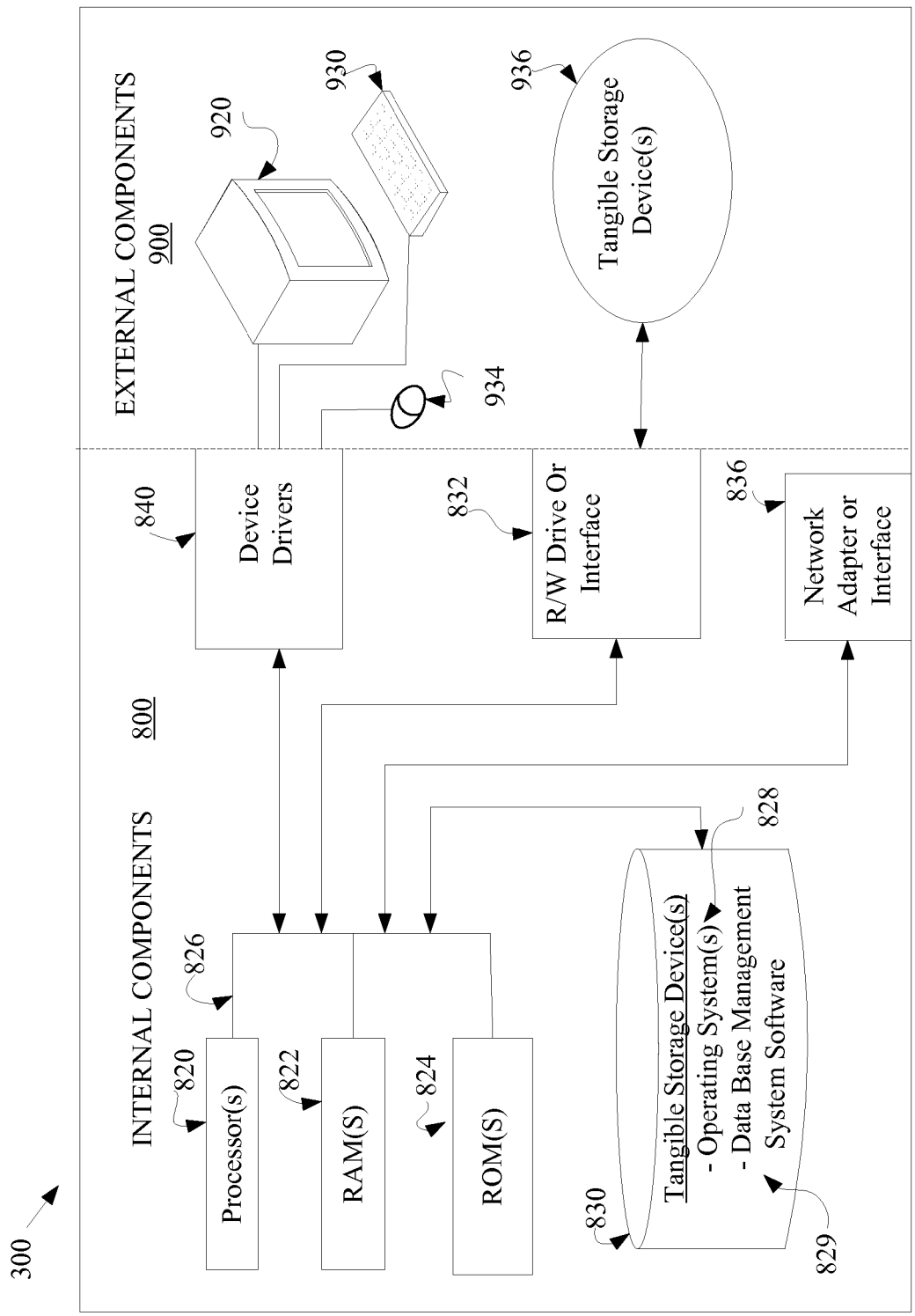
FIG. 3 is a schematic block diagram of hardware and software of the computer environment according to an embodiment of the method of FIG. 2.

Referring now to FIG. 3, server 102 may also include respective sets of internal components 800 and external components 900. Each of the sets of internal components 800 includes one or more processors 820; one or more computer-readable RAMs 822; one or more computer-readable ROMs 824 on one or more buses 826; one or more operating systems 828; one or more software applications (e.g., Data Base Management System Software 829); and one or more computer-readable tangible storage devices 830. The one or more operating systems 828 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The firmware 838 and operating system 828 that are associated with computing device 700, can be downloaded to computing device 700 from an external computer (e.g., server) via a network (for example, the Internet, a local area network or other, wide area network) and respective network adapters or interfaces 836. From the network adapters (or switch port adaptors) or interfaces 836, the firmware 838 and operating system 828 associated with computing device 700 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in FIGS. 1-3 illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of classifying and monitoring database operations based on a recovery cost comprising:
   receiving an indication of a recoverable operation wherein the recoverable operation is an operation that changes the state of a database object and wherein the database object includes one or more of: user data, and a database control structure;
   associating a recovery cost value to each recoverable operation wherein the recovery cost value is the cost to recover the recoverable operation and wherein the recovery cost value is a multiple of units to perform a base operation; and
   incrementing a count in a persistent storage corresponding to an occurrence of the recoverable operation.

2. The method of claim 1, wherein receiving the indication of the recoverable operation further comprises:
   identifying the recoverable operation responsive to parsing a transaction log record.

3. The method of claim 1, wherein a recovery time for the recoverable operation is the product of:
   the recovery cost value corresponding to the recoverable operation;
   the count corresponding to the recoverable operation; and
   a unit process time, wherein the unit process time represents an amount of time corresponding to each unit comprising the recovery cost value.

4. The method of claim 1, wherein the recoverable operations are grouped into a plurality of recovery classes according to a recovery cost value.

5. The method of claim 1, wherein the plurality of recovery classes comprises a range of recovery cost values.

6. The method of claim 1, wherein the range of recovery cost values in the plurality of recovery classes is modifiable.

7. The method of claim 1, wherein the recovery cost value is modifiable.

* * * * *